US012344089B2

(12) United States Patent
George et al.

(10) Patent No.: US 12,344,089 B2
(45) Date of Patent: Jul. 1, 2025

(54) TECHNIQUES FOR PROPRIOCEPTIVE TORQUE DISTRIBUTION CONTROL IN MULTI-MOTOR ELECTRIFIED VEHICLES

(71) Applicant: FCA US LLC, Auburn Hills, MI (US)

(72) Inventors: Alexander J George, Whitmore Lake, MI (US); Chunjian Wang, Troy, MI (US); Drushan Mavalankar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 289 days.

(21) Appl. No.: 18/191,980

(22) Filed: Mar. 29, 2023

(65) Prior Publication Data
US 2024/0326587 A1   Oct. 3, 2024

(51) Int. Cl.
| B60K 23/08 | (2006.01) |
| B60K 1/02 | (2006.01) |
| B60K 17/356 | (2006.01) |
| B60L 15/20 | (2006.01) |

(52) U.S. Cl.
CPC ............ B60K 23/0808 (2013.01); B60K 1/02 (2013.01); B60L 15/20 (2013.01); B60K 17/356 (2013.01); B60L 2240/14 (2013.01); B60L 2240/423 (2013.01); B60L 2240/46 (2013.01); B60L 2240/461 (2013.01)

(58) Field of Classification Search
CPC .... B60K 23/0808; B60K 1/02; B60K 17/356; B60L 15/20; B60L 2240/14; B60L 2240/423; B60L 2240/46; B60L 2240/461465
See application file for complete search history.

(56) References Cited

U.S. PATENT DOCUMENTS

| 9,488,987 | B2 | 11/2016 | Goulding | |
| 9,731,599 | B2 | 8/2017 | Gagnon | |
| 9,791,860 | B2 | 10/2017 | Phillips et al. | |
| 11,277,956 | B2 | 3/2022 | Bertucci et al. | |
| 2007/0271018 | A1* | 11/2007 | Hofmann | B60G 21/0555 701/69 |
| 2018/0281603 | A1* | 10/2018 | Nordmann | B60L 3/102 |
| 2022/0101662 | A1 | 3/2022 | Griffin et al. | |
| 2023/0022383 | A1 | 1/2023 | Madineni | |

FOREIGN PATENT DOCUMENTS

| CN | 106446370 A | * | 2/2017 | ............. G06F 30/15 |
| CN | 217706096 U | | 11/2022 | |
| JP | H05328542 A | * | 12/1993 | ............. B60L 15/20 |
| JP | 2660992 B2 | * | 10/1997 | ............. Y02T 10/72 |

* cited by examiner

*Primary Examiner* — Michael J Zanelli
(74) *Attorney, Agent, or Firm* — Jeremy J. Klobucar

(57) ABSTRACT

Proprioceptive torque distribution control systems and methods for an electrified vehicle having a multi-motor electrified powertrain including two or more electric motors involve an accelerometer sensor system configured to measure accelerations of the electrified vehicle relative to three perpendicular axes, and a controller configured to determine four relative degrees of contact by four wheels of the electrified vehicle with a ground surface, respectively, based on the measured accelerations and travel of a suspension of the electrified vehicle, and control a distribution of a total amount of drive torque generated by the multi-motor electrified powertrain between the four wheels of the electrified vehicle based on their respective four relative degrees of contact with the ground surface to thereby improve performance and stability of the electrified vehicle.

20 Claims, 3 Drawing Sheets

TECHNIQUES FOR PROPRIOCEPTIVE TORQUE DISTRIBUTION CONTROL IN MULTI-MOTOR ELECTRIFIED VEHICLES

FIELD

The present application generally relates to electrified vehicles and, more particularly, to techniques for proprioceptive torque distribution control in multi-motor electrified vehicles.

BACKGROUND

In conventional four-wheel vehicles, there are four contact patches that support the vehicle's weight and through which force is applied for propulsive power. This applied force is the drive torque generated by a powertrain, which could include an internal combustion engine, an electric motor, or some combination thereof. Conventional solutions to distributing propulsive torque amongst the four wheels include open differentials, locking differentials, and limited slip differentials, each of which has its limitations. More specifically, an open differential applies equal torque to each wheel regardless of speed, a locking differential applies the same speed to each wheel regardless of torque (when locked), and a limited slip differential biases the torque between two wheels of a pair (e.g., front wheels or rear wheels) as a function of the different in speed between the wheels. Accordingly, while such conventional electrified powertrains and their control systems and methods do work well for their intended purpose, there exists an opportunity for improvement in the relevant art.

SUMMARY

According to one example aspect of the invention, a proprioceptive torque distribution control system for an electrified vehicle having a multi-motor electrified powertrain including two or more electric motors is presented. In one exemplary implementation, the proprioceptive torque distribution control system comprises an accelerometer sensor system configured to measure accelerations of the electrified vehicle relative to three perpendicular axes and a controller configured to determine four relative degrees of contact by four wheels of the electrified vehicle with a ground surface, respectively, based on the measured accelerations and travel of a suspension of the electrified vehicle, and control a distribution of a total amount of drive torque generated by the multi-motor electrified powertrain between the four wheels of the electrified vehicle based on their respective four relative degrees of contact with the ground surface to thereby improve performance and stability of the electrified vehicle.

In some implementations, the controller is configured to determine a torque bias estimate for controlling the two or more electric motors of the electrified powertrain. In some implementations, the controller is further configured to determine the torque bias estimate based on (i) per-wheel load fractions and (ii) a suspension droop deviation scalar. In some implementations, determine the per-wheel load fractions based on a modeled static center of mass of the electrified vehicle. In some implementations, the controller is further configured to determine the modeled static center of mass of the electrified vehicle based on the measured accelerations, a known center of mass location of the electrified vehicle, and known contact patch locations of the electrified vehicle. In some implementations, the controller is further configured to determine the suspension droop deviation scalar based on (i) a per-wheel suspension droop indicated by the suspension travel and (ii) an average suspension droop having transfer function curves applied thereto.

In some implementations, the controller is configured to control the distribution of the total amount of drive torque generated by the multi-motor electrified powertrain between the four wheels of the electrified vehicle irrespective of wheel slip. In some implementations, the controller is further configured to, in response to wheel speed deviation occurring, adjust the distribution of the total amount of drive torque generated by the multi-motor electrified powertrain between the four wheels of the electrified vehicle. In some implementations, for two and three electric motor configurations of the electrified powertrain, the controller is configured to account for additional driveline components, if any, between each electric motor and its respective one or more wheels, in controlling the distribution of the total amount of drive torque generated by the multi-motor electrified powertrain. In some implementations, the multi-motor electrified powertrain comprises four electric motors configured to directly drive the four wheels of the electrified vehicle, respectively.

According to another example aspect of the invention, a proprioceptive torque distribution control method for an electrified vehicle having a multi-motor electrified powertrain including two or more electric motors is presented. In one exemplary implementation, the proprioceptive torque distribution control method comprises determining, by a controller of the electrified vehicle, four relative degrees of contact by four wheels of the electrified vehicle with a ground surface, respectively, based on (i) measured accelerations of the electrified vehicle relative to three perpendicular axes as provided by an accelerometer system and (ii) travel of a suspension of the electrified vehicle, and controlling, by the controller, a distribution of a total amount of drive torque generated by the multi-motor electrified powertrain between the four wheels of the electrified vehicle based on their respective four relative degrees of contact with the ground surface to thereby improve performance and stability of the electrified vehicle.

In some implementations, the method further comprises determining, by the controller, a torque bias estimate for controlling the two or more electric motors of the electrified powertrain. In some implementations, the method further comprises determining, by the controller, the torque bias estimate based on (i) per-wheel load fractions and (ii) a suspension droop deviation scalar. In some implementations, the method further comprises determining, by the controller, the per-wheel load fractions based on a modeled static center of mass of the electrified vehicle. In some implementations, the method further comprises determining, by the controller, the modeled static center of mass of the electrified vehicle based on the measured accelerations, a known center of mass location of the electrified vehicle, and known contact patch locations of the electrified vehicle. In some implementations, the method further comprises determining, by the controller, the suspension droop deviation scalar based on (i) a per-wheel suspension droop indicated by the suspension travel and (ii) an average suspension droop having transfer function curves applied thereto.

In some implementations, the method further comprises further comprising controlling, by the controller, the distribution of the total amount of drive torque generated by the multi-motor electrified powertrain between the four wheels of the electrified vehicle irrespective of wheel slip. In some implementations, the method further comprises in response to wheel speed deviation occurring, adjusting, by the controller, the distribution of the total amount of drive torque generated by the multi-motor electrified powertrain between the four wheels of the electrified vehicle. In some implementations, for two and three electric motor configurations of the electrified powertrain, the controller is configured to account for additional driveline components, if any, between each electric motor and its respective one or more wheels, in controlling the distribution of the total amount of drive torque generated by the multi-motor electrified powertrain. In some implementations, the multi-motor electrified powertrain comprises four electric motors configured to directly drive the four wheels of the electrified vehicle, respectively.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
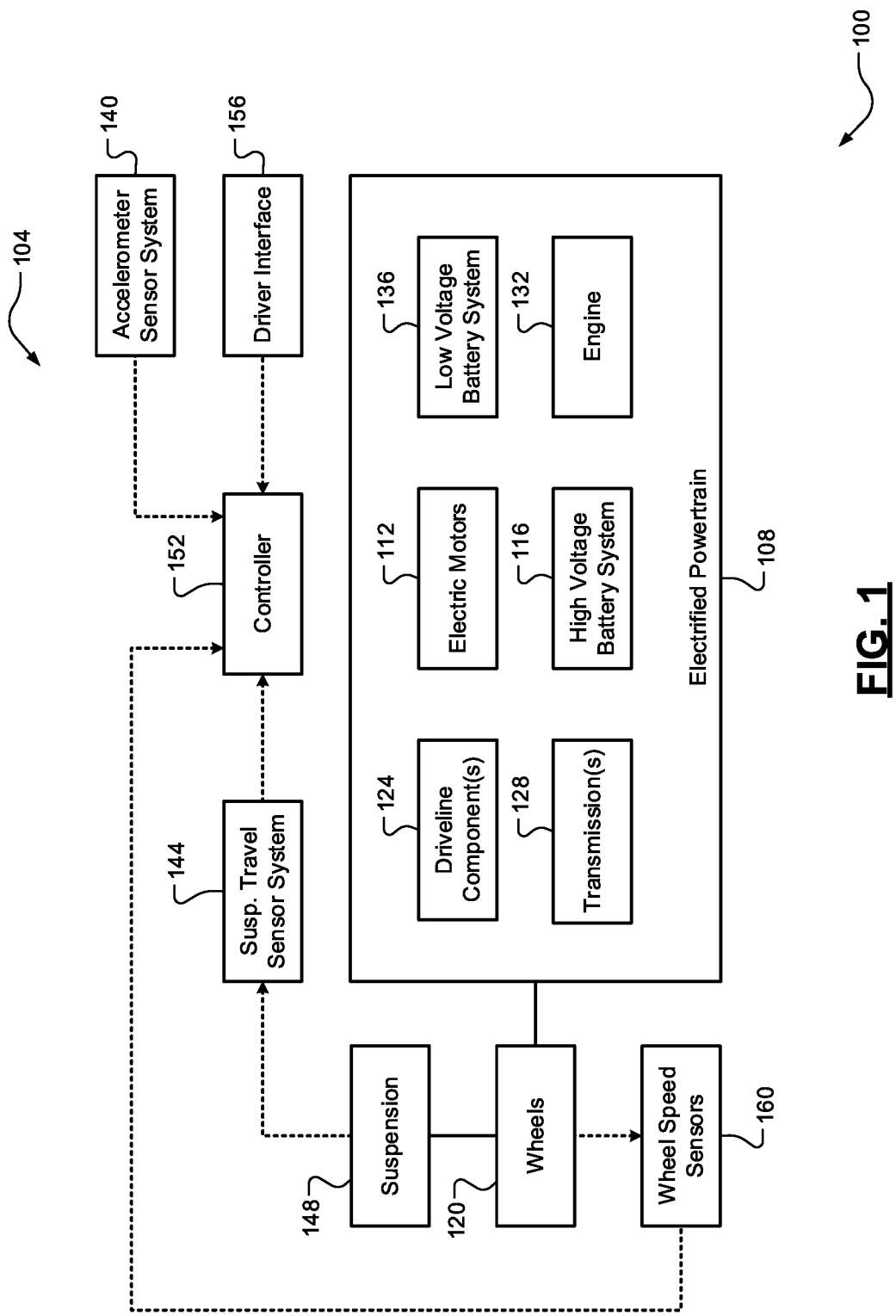
FIG. 1 is a functional block diagram of an electrified vehicle having an example proprioceptive torque distribution control system according to the principles of the present application.

As discussed above, conventional solutions to distributing propulsive torque amongst four wheels of a four-wheel vehicle include open differentials, locking differentials, and limited slip differentials, each of which has its limitations. Electrified vehicles have electrified powertrains that include one or more electric motors configured to generate drive torque using electrical energy provided by a battery system. A four-motor (one electric motor per wheel) electrified powertrain solution could provide for nearly unlimited flexibility. The above-described conventional control techniques, however, are feedback-based and require wheel slip to occur to infer grip loss before corrective action is taken. This reactive type of solution negatively affects vehicle performance and stability. Thus, there exists an opportunity for improvement in the relevant art.

Accordingly, techniques for proprioceptive torque distribution control in multi-motor electrified vehicles are presented herein. These techniques do not attempt to calculate ultimate grip and enforce a torque limit to avoid slip, as this is considered to be "intrusive." Instead, this is left to the driver to handle and the techniques' goal is to bias the commanded torque proportionally to match the weight distribution of the vehicle, so that the driver will have the maximum amount of grip possible available for use. If the techniques are working perfectly and the driver commands more torque than the wheels/tires have grip, all tires will slip at the same time.

These techniques are loosely based on the concept of "proprioception," which refers to the process by which animals sense the weight and position of their own bodies in the environment and use this information to adjust forces for locomotive control (also known as a "sixth sense"). The techniques sense the vehicle's orientation and suspension position (e.g., using a three-axis accelerometer system and an optional suspension travel sensor system) and apportion the total driver torque request to the four wheels for the best performance given the amount of weight estimated on each contact patch. These techniques are feedforward control techniques (i.e., before detecting wheel slip) that could be applied on top of or in addition to existing (legacy) feedback-based controls (i.e., after wheel slip occurs). These techniques apply to four motor (one electric motor per wheel) electrified powertrains as well as two and three electric motor electrified powertrain configurations (e.g., by accounting for intermediary driveline components, such as differentials). For two and three electric motor electrified powertrain configurations, intermediary driveline components (transfer cases, differentials, etc.) are accounted for in determining and controlling the torque distribution amongst the wheels of the electrified vehicle as these types of components could limit the precision of torque distribution control per wheel. Potential benefits of these techniques include improved vehicle performance and stability, particularly during off-road driving conditions.

Referring now to FIG. 1, a functional block diagram of an electrified vehicle 100 having an example proprioceptive torque distribution control system 104 according to some implementations of the present application is illustrated. The electrified vehicle 100 includes an electrified powertrain 108 having two or more electric motors 112-1 ... 112-N (collectively, "electric motors 112," where N is an integer ≥2), also referred to as "multi-motor electrified powertrain 108." Each electric motor 112 is configured to generate mechanical drive torque using electrical energy from a high voltage battery system 116. While a single high voltage battery system 116 is shown, it will be appreciated that the electrified powertrain 108 could include a plurality of high voltage battery systems 116 (e.g., one per electric motor, or N total). Some of the electric motor(s) 112 could be configured to provide drive torque directly to one of four wheels 120 of the electrified vehicle 100, whereas other electric motor(s) 112 could be configured to provide torque to at least some of the wheels 120 via intermediary driveline components 124 (transfer cases, differentials, etc.). One or more optional transmission 128 could also be implemented and configured to transfer the drive torque from the electric motor(s) 112 to the wheels 120 or the intermediary driveline components 124.

An optional internal combustion engine 132 could also be implemented and configured to combust a mixture of air and fuel (e.g., gasoline) to generate drive torque for propulsion and/or recharging of the high voltage battery system 116 (e.g., while operating as a generator to generate electrical energy). If the engine 132 is configured to generate drive torque for propulsion, then its contribution of to the total amount of drive torque for distribution amongst the four wheels 120 must be properly accounted for. The electrified powertrain 108 also includes a low voltage battery system 136 for powering low voltage accessory components of the electrified powertrain 108 or of the electrified vehicle 100 in general. An accelerometer sensor system 140 (e.g., a three-axis accelerometer) is configured measure accelerations of the electrified vehicle 100 relative to three perpendicular axes (i.e., x/y/z axes). An optional suspension travel sensor system 144 is configured to measure travel of a suspension 148 of the electrified vehicle 100 relative to each wheel 120 (e.g., travel between low and high points of travel). A controller 152 is configured to control operation the electrified powertrain 108, such as based on a driver torque request via a driver interface 156 (e.g., an accelerator pedal). Wheel speed sensors 160 could also measure/detect speeds of each of the four wheels 120.

Per the techniques of the present application, the controller 152 is configured to determine four relative degrees of contact by four wheels 120 of the electrified vehicle 100 with a ground surface, respectively, based on the measured accelerations and the measured travel suspension from the respective sensor systems 140, 144. It will be appreciated that the suspension travel could be modeled or determined based on other parameters. The controller 152 is also configured to control a distribution of a total amount of drive torque generated by the multi-motor electrified powertrain 108 between the four wheels 120 of the electrified vehicle 100 based on their respective four relative degrees of contact with the ground surface to thereby improve performance and stability of the electrified vehicle 100. In other words, the controller 152, per the techniques of the present application, aims to distribute the total amount of drive torque generated by the electrified powertrain 108 (the two or more electric motors 112) such that it is proportionally apportioned to each of the wheels 120 based on their relative degrees of contact with the ground surface. The specific calculations of the controller 152 will now be described in greater detail.

Figure 2:
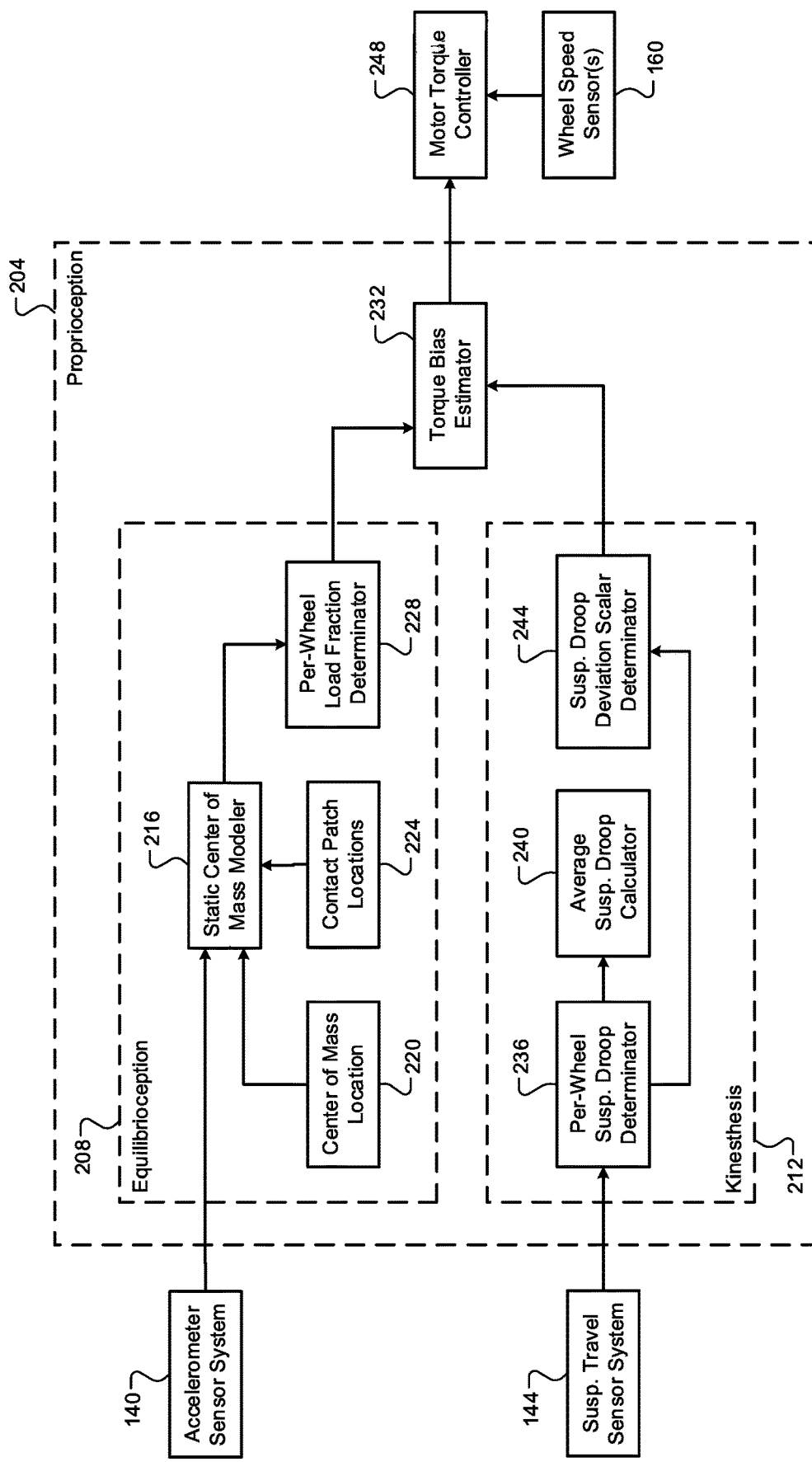
FIG. 2 is a functional block diagram of an example proprioceptive torque distribution control architecture according to the principles of the present application.

Referring now to FIG. 2 and with continued reference to FIG. 1, a functional block diagram of an example proprioceptive torque distribution control architecture 200 according to the principles of the present application is illustrated. The architecture 200 can be generally divided into three different steps: (i) equilibrioception 204 (the perception of balance and spatial orientation, (ii) kinesthesis 208 (the perception of body movements, and (iii) proprioception 212 (the sense of self-movement, force, and body position). A static center of mass modeler 216 receives the measured x/y/z accelerations from the accelerometer sensor system 140 as well as a known center of mass location 220 and known contact patch locations 224 of the electrified vehicle 100 (e.g., stored in memory). The modeler 216 outputs a modeled static center of mass of the electrified vehicle 100, which is input to a per-wheel load fraction determinator 228. The determinator 228 determines the relative load fractions on each of the four wheels 120, and this torque bias estimate is output to a torque bias estimator 232. In parallel, a per-wheel suspension droop determinator 236 determines per-wheel suspension droop (i.e., vertical travel) based on measurements from the suspension travel sensor system 144 or modeled values. This output is fed to both a suspension droop average calculator 240 and a droop deviation scalar determinator 244.

The average suspension droop from the calculator 240 is also fed into the scalar determinator 244 (e.g., accounting for transfer function curves, which are described in greater detail below). The droop deviation scalar determinator 244 uses these inputs to determine a suspension droop deviation scalar, which is output to the torque bias estimator 232. The torque bias estimator 232 uses this input and the other input (the torque bias estimated from the relative load fractions on each of the four wheels 120) to scale (e.g., multiply) the torque bias estimate and then use this value to control a torque distribution amongst the four wheels to use in controlling the electric motors 112 via a motor torque controller 248. This includes accounting for additional driveline components 124, if any, between each electric motor 112 and its respective one or more wheels 120. This control of the distribution of the total amount of drive torque generated by the multi-motor electrified powertrain 108 between the four wheels 120 is proactive or feedforward in that it happens irrespective of whether wheel slip follows. The controller 152 (and architecture 200—specifically, motor torque controller 248) could be further configured to, in response to the wheel speeds (based on measurements from wheel speed sensors 160) deviating from expected, further adjust the distribution of the total amount of drive torque generated by the multi-motor electrified powertrain 108 between the four wheels 120 (e.g., closed-loop feedback-based adjustment).

The following describes a dynamic load transfer calculation with accelerations $a_x$, $a_y$, $a_z$ and a rigid suspension. First, moment balances with respect to left front contact patch and a right front contact patch are calculated as follows:

$$F_{zRight}w - \frac{1}{2}w(mg - m_s a_z) = ma_y h \Rightarrow F_{zRight} = \frac{1}{2}m\left(g - \frac{m_s}{m}a_z + a_y\frac{2h}{w}\right), \text{ and}$$

$$F_{zRear}L - (mg - m_s a_z)a = ma_x h \Rightarrow F_{zRear} = m\left(g\frac{a}{L} - \frac{m_s}{m}a_z\frac{a}{L} + a_x\frac{h}{L}\right),$$

where m, w, l, h, and g are known variables including vehicle mass, width, length, height, and gravity.

Then, using vertical force balance:

$$F_{zLeft} + F_{zRight} = F_{zFront} + F_{zRear} =$$

$$m\left(g - \frac{m_s}{m}a_z\right) \Rightarrow F_{zLeft} = \frac{1}{2}m\left(g - \frac{m_s}{m}a_z - a_y\frac{2h}{w}\right) \Rightarrow \frac{1}{2}\Delta F_{zLeftRight} = ma_y\frac{h}{w}$$

$$F_{zFront} = m\left(g\frac{b}{L} - \frac{m_s}{m}a_z\frac{b}{L} - a_x\frac{h}{L}\right) \Rightarrow \frac{1}{2}\Delta F_{zFrontRear} =$$

$$\frac{1}{2}m\left(g\frac{a-b}{L} - \frac{m_s}{m}a_z\frac{a-b}{L} + a_x\frac{2h}{L}\right).$$

Next, the left-right load transfer $$\frac{1}{2}\Delta F_{zLeftRight}$$

follows the ratio of front-rear:

$$\text{Front Load Transfer Part} = \frac{1}{2}\Delta F_{zLeftRight}\frac{F_{zFront}}{F_{zFront} + F_{zRear}}, \text{ and}$$

$$\text{Rear Load Transfer Part} = \frac{1}{2}\Delta F_{zLeftRight}\frac{F_{zRear}}{F_{zFront} + F_{zRear}}.$$

Finally, the final tire vertical forces $F_{ZFL}$, $F_{ZFR}$, $F_{ZRL}$, and $F_{ZRR}$ are calculated as follows:

$$F_{zFL} = \frac{1}{2}\left(F_{zFront} - \Delta F_{zLeftRight}\frac{F_{zFront}}{F_{zFront} + F_{zRear}}\right) \Rightarrow F_{zFL} =$$

$$\frac{m\left(g\frac{b}{L} - \frac{m_s}{m}a_z\frac{b}{L} - a_x\frac{h}{L}\right)\left(g - \frac{m_s}{m}a_z - a_y\frac{2h}{w}\right)}{2\left(g - \frac{m_s}{m}a_z\right)},$$

-continued $$F_{zFR} = \frac{m\left(g\frac{b}{L} - \frac{m_s}{m}a_z\frac{b}{L} - a_x\frac{h}{L}\right)\left(g - \frac{m_s}{m}a_z + a_y\frac{2h}{w}\right)}{2\left(g - \frac{m_s}{m}a_z\right)},$$

$$F_{zRL} = \frac{m\left(g\frac{a}{L} - \frac{m_s}{m}a_z\frac{a}{L} + a_x\frac{h}{L}\right)\left(g - \frac{m_s}{m}a_z - a_y\frac{2h}{w}\right)}{2\left(g - \frac{m_s}{m}a_z\right)}, \text{ and}$$

$$F_{zRR} = \frac{m\left(g\frac{a}{L} - \frac{m_s}{m}a_z\frac{a}{L} + a_x\frac{h}{L}\right)\left(g - \frac{m_s}{m}a_z + a_y\frac{2h}{w}\right)}{2\left(g - \frac{m_s}{m}a_z\right)}.$$

Figure 3:
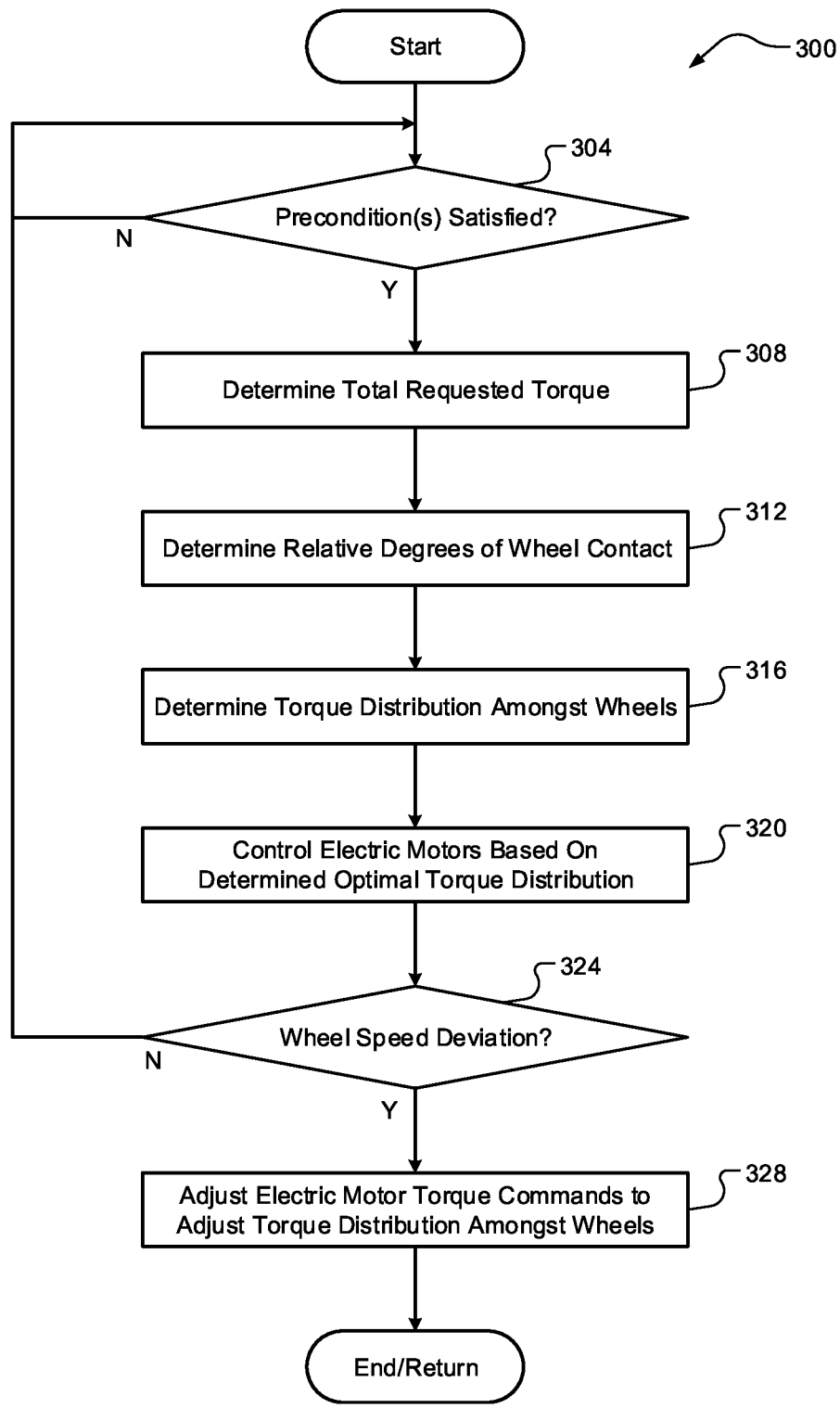
FIG. 3 is a flow diagram of an example proprioceptive torque distribution control method for an electrified vehicle according to the principles of the present application.

Referring now to FIG. 3, a flow diagram of an example proprioceptive torque distribution control method 300 for an electrified vehicle according to the principles of the present application. While the electrified vehicle 100 and its components are specifically referenced for illustrative/descriptive purposes, it will be appreciated that the method 300 could be applicable to any suitable electrified vehicle having a multi-motor electrified powertrain. At optional 304, the controller 152 determines whether a set of precondition(s) are satisfied. Non-limiting examples of these precondition(s) include the electrified powertrain 108 being fully enabled/operational, no malfunctions or faults being currently present, and/or a specific mode (e.g., 4WD low or aggressive off-road) being selected. When true, the method 300 proceeds to 308. Otherwise, the method 300 ends or returns to 304. At 308, the controller 152 determines a total torque request based on a received driver torque request (e.g., via the driver interface 156)Det.

At 312, the controller 152 determines four relative degrees of contact by the four wheels 120 with a ground surface, respectively, based on the measured accelerations and the measured travel suspension from sensor systems 140, 144. At 316, the controller 152 determines a distribution of the total requested torque between the four wheels 120 based on their respective four relative degrees of contact with the ground surface. At 320, the controller 152 controls the electric motors based on the determined optimal torque distribution amongst the four wheels 120 to thereby improve performance and stability of the electrified vehicle 100. At optional 324, the controller 152 could detect whether any wheel speed deviation occurs. When false, the method 300 ends or returns to 304. When true, at optional 328 the controller 152 could perform further adjustment of the torque distribution amongst the wheels 120 and the method 300 could then end or return to 304 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A proprioceptive torque distribution control system for an electrified vehicle having a multi-motor electrified powertrain including two or more electric motors, the proprioceptive torque distribution control system comprising:
   an accelerometer sensor system configured to measure accelerations of the electrified vehicle relative to three perpendicular axes; and
   a controller configured to:
      determine four relative degrees of contact by four wheels of the electrified vehicle with a ground surface, respectively, based on the measured accelerations and travel of a suspension of the electrified vehicle; and
      control a distribution of a total amount of drive torque generated by the multi-motor electrified powertrain between the four wheels of the electrified vehicle based on their respective four relative degrees of contact with the ground surface to thereby improve performance and stability of the electrified vehicle.

2. The proprioceptive torque distribution control system of claim 1, wherein the controller is configured to determine a torque bias estimate for controlling the two or more electric motors of the electrified powertrain.

3. The proprioceptive torque distribution control system of claim 2, wherein the controller is further configured to determine the torque bias estimate based on (i) per-wheel load fractions and (ii) a suspension droop deviation scalar.

4. The proprioceptive torque distribution control system of claim 3, wherein the controller is further configured to determine the per-wheel load fractions based on a modeled static center of mass of the electrified vehicle.

5. The proprioceptive torque distribution control system of claim 4, wherein the controller is further configured to determine the modeled static center of mass of the electrified vehicle based on the measured accelerations, a known center of mass location of the electrified vehicle, and known contact patch locations of the electrified vehicle.

6. The proprioceptive torque distribution control system of claim 3, wherein the controller is further configured to determine the suspension droop deviation scalar based on (i) a per-wheel suspension droop indicated by the suspension travel and (ii) an average suspension droop having transfer function curves applied thereto.

7. The proprioceptive torque distribution control system of claim 1, wherein the controller is configured to control the distribution of the total amount of drive torque generated by the multi-motor electrified powertrain between the four wheels of the electrified vehicle irrespective of wheel slip.

8. The proprioceptive torque distribution control system of claim 7, wherein the controller is further configured to, in response to wheel speed deviation occurring, adjust the distribution of the total amount of drive torque generated by the multi-motor electrified powertrain between the four wheels of the electrified vehicle.

9. The proprioceptive torque distribution control system of claim 1, wherein for two and three electric motor configurations of the electrified powertrain, the controller is configured to account for additional driveline components, if any, between each electric motor and its respective one or more wheels, in controlling the distribution of the total amount of drive torque generated by the multi-motor electrified powertrain.

10. The proprioceptive torque distribution control system of claim 1, wherein the multi-motor electrified powertrain comprises four electric motors configured to directly drive the four wheels of the electrified vehicle, respectively.

11. A proprioceptive torque distribution control method for an electrified vehicle having a multi-motor electrified powertrain including two or more electric motors, the proprioceptive torque distribution control method comprising:

determining, by a controller of the electrified vehicle, four relative degrees of contact by four wheels of the electrified vehicle with a ground surface, respectively, based on (i) measured accelerations of the electrified vehicle relative to three perpendicular axes as provided by an accelerometer system and (ii) travel of a suspension of the electrified vehicle; and controlling, by the controller, a distribution of a total amount of drive torque generated by the multi-motor electrified powertrain between the four wheels of the electrified vehicle based on their respective four relative degrees of contact with the ground surface to thereby improve performance and stability of the electrified vehicle.

12. The proprioceptive torque distribution control method of claim 11, further comprising determining, by the controller, a torque bias estimate for controlling the two or more electric motors of the electrified powertrain.

13. The proprioceptive torque distribution control method of claim 12, further comprising determining, by the controller, the torque bias estimate based on (i) per-wheel load fractions and (ii) a suspension droop deviation scalar.

14. The proprioceptive torque distribution control method of claim 13, further comprising determining, by the controller, the per-wheel load fractions based on a modeled static center of mass of the electrified vehicle.

15. The proprioceptive torque distribution control method of claim 14, further comprising determining, by the controller, the modeled static center of mass of the electrified vehicle based on the measured accelerations, a known center of mass location of the electrified vehicle, and known contact patch locations of the electrified vehicle.

16. The proprioceptive torque distribution control method of claim 13, further comprising determining, by the controller, the suspension droop deviation scalar based on (i) a per-wheel suspension droop indicated by the suspension travel and (ii) an average suspension droop having transfer function curves applied thereto.

17. The proprioceptive torque distribution control method of claim 11, further comprising controlling, by the controller, the distribution of the total amount of drive torque generated by the multi-motor electrified powertrain between the four wheels of the electrified vehicle irrespective of wheel slip.

18. The proprioceptive torque distribution control method of claim 17, further comprising in response to wheel speed deviation occurring, adjusting, by the controller, the distribution of the total amount of drive torque generated by the multi-motor electrified powertrain between the four wheels of the electrified vehicle.

19. The proprioceptive torque distribution control method of claim 11, wherein for two and three electric motor configurations of the electrified powertrain, the controller is configured to account for additional driveline components, if any, between each electric motor and its respective one or more wheels, in controlling the distribution of the total amount of drive torque generated by the multi-motor electrified powertrain.

20. The proprioceptive torque distribution control method of claim 11, wherein the multi-motor electrified powertrain comprises four electric motors configured to directly drive the four wheels of the electrified vehicle, respectively.

* * * * *